(12) United States Patent
Gao et al.

(10) Patent No.: US 10,649,892 B2
(45) Date of Patent: May 12, 2020

(54) OPERATING A RAW MIRROR WITHIN A RAID SYSTEM

(71) Applicant: EMC IP Holding Company LLC, Hopkinton, MA (US)

(72) Inventors: Hongpo Gao, Beijing (CN); Ree Sun, Beijing (CN); Huadong Li, Beijing (CN); Wayne Li, Beijing (CN); Jibing Dong, Beijing (CN); Shaoqin Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 220 days.

(21) Appl. No.: 15/710,809

(22) Filed: Sep. 20, 2017

(65) Prior Publication Data

US 2018/0089077 A1 Mar. 29, 2018

(30) Foreign Application Priority Data

Sep. 23, 2016 (CN) .......................... 2016 1 0849524

(51) Int. Cl.
*G06F 12/02* (2006.01)
*G06F 3/06* (2006.01)
*G06F 11/20* (2006.01)
*G06F 11/10* (2006.01)

(52) U.S. Cl.
CPC .......... *G06F 12/0246* (2013.01); *G06F 3/064* (2013.01); *G06F 3/067* (2013.01); *G06F 3/0632* (2013.01); *G06F 3/0643* (2013.01); *G06F 3/0689* (2013.01); *G06F 11/1076* (2013.01); *G06F 11/2069* (2013.01)

(58) Field of Classification Search
CPC ............. G06F 12/0246; G06F 11/1076; G06F 11/2069; G06F 3/0604; G06F 3/0632; G06F 3/0643; G06F 3/067; G06F 3/0689
USPC ......................................... 711/114, 135, 162
See application file for complete search history.

(56) References Cited

U.S. PATENT DOCUMENTS

| | | | |
|---|---|---|---|
| 6,985,996 B1 * | 1/2006 | Nagshain | G06F 11/1096 711/114 |
| 9,710,383 B1 | 7/2017 | Xu et al. | |
| 9,734,074 B2 | 8/2017 | Jia et al. | |
| 9,792,056 B1 | 10/2017 | Gao et al. | |
| 10,146,456 B1 | 12/2018 | Gao et al. | |
| 10,229,022 B1 | 3/2019 | Gao et al. | |
| 10,296,223 B2 | 5/2019 | Dong et al. | |
| 10,324,810 B2 | 6/2019 | Gao et al. | |
| 10,402,104 B2 | 9/2019 | Yang et al. | |
| 2009/0228744 A1 * | 9/2009 | Deenadhayalan | G06F 11/1004 714/48 |

(Continued)

*Primary Examiner* — Tuan V Thai
*Assistant Examiner* — Edward Waddy, Jr.
(74) *Attorney, Agent, or Firm* — BainwoodHuang

(57) ABSTRACT

Embodiments of the present disclosure provide a method of managing a redundant array of independent disks (RAID) system and an electronic device. The method includes configuring a plurality of disks in the RAID system as a raw mirror for storing configuration data of the RAID system; storing metadata for the raw mirror in the plurality of disks, the metadata stored in each of the plurality disks including an identifier identifying that the disk belongs to the raw mirror and a sequence number identifying a writing operation for a block storing the metadata in the disk; and controlling reading and writing of the raw mirror based on the metadata.

27 Claims, 9 Drawing Sheets

(56) References Cited

U.S. PATENT DOCUMENTS

2012/0063463 A1* 3/2012 Hayashi .............. H04L 49/9094
  370/394
2017/0317947 A9* 11/2017 Karamanolis ....... G06F 12/0802

* cited by examiner

OPERATING A RAW MIRROR WITHIN A RAID SYSTEM

RELATED APPLICATIONS

This application claim priority from Chinese Patent Application Number CN201610849524.7, filed on Sep. 23, 2016 at the State Intellectual Property Office, China, titled "MANAGEMENT METHOD AND ELECTRONIC DEVICE FOR RAID SYSTEM" the contents of which is herein incorporated by reference in its entirety.

FIELD

The present disclosure generally relates to storage technology, and more particularly, to a method of managing a redundant array of independent disks system and an electronic device.

BACKGROUND

Typically, in storage products of a redundant array of independent disks (RAID), Topology Service is defined and implemented to manage an RAID group (RG) object and a LUN object. The RG object can be used to implement an RAID algorithm and the LUN object can be used to export a region of the RG to an upper layer. Provision Drive (PVD) object can be used to abstract some common disk attributes from different disks provided by vendors mainly for the purpose of managing the disks. To manage configuration of RG/LUN/PVD, their configuration data and metadata need to be stored in the disks.

When a RAID system is booted, the RAID system will load the configuration data and the metadata from the disks and create the RG object, the LUN object and the PVD object in the memory. Thus, the data configuration is vital and redundancy is required for storing in the disks. In some storage products, the configuration data will be stored in three disks and protected with RAID 1 algorithm.

In a RAID storage system, the system topology and objects provide background data together. After the system topology is set up, there are system threads to monitor the system RAID groups, which can be called as a background service. The background service will manage and protect data on the disks automatically, such as driver swapping, data rebuilding on a new driver and data verification, etc.

However, at present, when reading system configuration data from a disk storing configuration data during the booting of a RAID system, the whole RAID system will be in an unavailable state, thus failing to meet performance requirements of a storage system.

SUMMARY

Embodiments of the present disclosure provide a method of managing a redundant array of independent disks (RAID) system and an electronic device.

According to a first aspect of the present disclosure, there is provided a method of managing the RAID system. The management method includes configuring a plurality of disks in the RAID system as a raw mirror for storing configuration data of the RAID system; storing metadata for the raw mirror in the plurality of disks, the metadata stored in each of the plurality of disks including an identifier identifying that the disk belongs to the raw mirror and a sequence number identifying a writing operation for a block storing the metadata in the disk; and controlling reading and writing of the raw mirror based on the metadata.

In some embodiments, controlling reading and writing of the raw mirror based on the metadata may include setting the identifiers in the plurality of disks; increasing the sequence numbers in the plurality of disks; and writing the configuration data into corresponding blocks of the plurality of disks. In some embodiments, controlling reading and writing of the raw mirror based on the metadata may include checking the identifiers in the plurality of disks; comparing the sequence numbers of corresponding blocks of the plurality of disks; and reading the configuration data from the corresponding block of the disk with the identifier and a maximum sequence number.

In some embodiments, the method may further include in response to booting of the RAID system, obtaining the sequence numbers of corresponding blocks of the plurality of disks; comparing the sequence numbers of the corresponding blocks of the plurality of disks; and storing a maximum sequence number in a cache as the latest sequence numbers for the corresponding blocks. In these embodiments, controlling reading and writing of the raw mirror based on the metadata may include obtaining from the cache the latest sequence numbers for the corresponding blocks of the plurality of disks; increasing the latest sequence numbers; storing the increased latest sequence numbers into the plurality of disks; and writing the configuration data into the corresponding blocks of the plurality of disks.

In some embodiments, the method may further include creating a raw mirror object for the raw mirror to manage the raw mirror, the raw mirror including at least one of a block size of the raw mirror, an edge array pointing to the raw mirror, a RAID algorithm of the raw mirror, an access switch of the raw mirror, and a capacity of the raw mirror. In some embodiments, the method may further include creating a RAID group object for the raw mirror to manage the raw mirror.

In some embodiments, the method may further include switching an access interface of the raw mirror from the raw mirror object to the RAID group object. In these embodiments, the method may further include performing at least one of driver swapping, data rebuilding, data verification or data replication on the RAID group object with a background service of the RAID system.

According to a second aspect of the present disclosure, there is provided an electronic device. The device includes at least one processor and at least one memory including computer program instructions. The at least one memory and the computer program instructions are configured, with the processor, to cause the device to configure a plurality of disks in a redundant array of independent disks (RAID) system as a raw mirror for storing configuration data of the RAID system; store metadata for the raw mirror in the plurality of disks, the metadata stored in each of the plurality of disks including an identifier identifying that the disk belongs to the raw mirror and a sequence number identifying a writing operation for a block storing the metadata in the disk; and control reading and writing of the raw mirror based on the metadata.

In some embodiments, the at least one memory and the computer program instructions can be further configured, with the processor, to cause the device to control reading and writing of the raw mirror by setting the identifiers in the plurality of disks, increasing the sequence numbers in the plurality of disks, and writing the configuration data into the corresponding blocks of the plurality of disks. In some embodiments, the at least one memory and the computer program instructions can be further configured, with the processor, to cause the device to control reading and writing of the raw mirror by checking the identifiers in the plurality of disks, comparing the sequence numbers of corresponding blocks of the plurality of disks, and reading the configuration data from the corresponding block of the disk with the identifier and a maximum sequence number.

In some embodiments, the at least one memory and the computer program instructions can be further configured, with the processor, to cause the device to obtain the sequence numbers of corresponding blocks of the plurality of disks in response to booting of the RAID system, compare the sequence numbers of the corresponding blocks of the plurality of disks, and store a maximum sequence number in a cache as the latest sequence numbers for the corresponding blocks. In these embodiments, the at least one memory and the computer program instructions can be further configured, with the processor, to cause the device to control reading and writing of the raw mirror by obtaining from the cache the latest sequence numbers for the corresponding blocks of the plurality of disks, increasing the latest sequence numbers, storing the increased latest sequence numbers into the plurality of disks, and writing the configuration data into the corresponding blocks of the plurality of disks.

In some embodiments, the at least one memory and the computer program instructions can be further configured, with the processor, to cause the device to create a raw mirror object for the raw mirror to manage the raw mirror, the raw mirror object including at least one of a block size of the raw mirror, an edge array pointing to the raw mirror, a RAID algorithm of the raw mirror, an access switch of the raw mirror, or a capacity of the raw mirror. In some embodiments, the at least one memory and the computer program instructions can be further configured, with the processor, to cause the device to create a RAID group object for the raw mirror to manage the raw mirror.

In some embodiments, the at least one memory and the computer program instructions can be further configured, with the processor, to cause the device to switch an access interface of the raw mirror from the raw mirror object to the RAID group object. In these embodiments, the at least one memory and the computer program instructions can be further configured, with the processor, to cause the device to perform at least one of driver swapping, data rebuilding, data verification or data replication on the RAID group object with a background service of the RAID system.

According to a third aspect of the present disclosure, there is provided a computer program product which is tangibly stored on a non-volatile computer readable medium and includes machine executable instructions, which when executed, causing a machine to perform the steps of the method according to the first aspect.

BRIEF DESCRIPTION OF THE DRAWINGS

Through the following detailed description with reference to the accompanying drawings, the above and other objectives, features, and advantages of example embodiments of the present disclosure will become more apparent. Several example embodiments of the present disclosure will be illustrated by way of example but not limitation in the drawings in which.

Throughout the drawings, the same or similar reference symbols are used to indicate the same or similar elements.

DETAILED DESCRIPTION OF EMBODIMENTS

Figure 1:
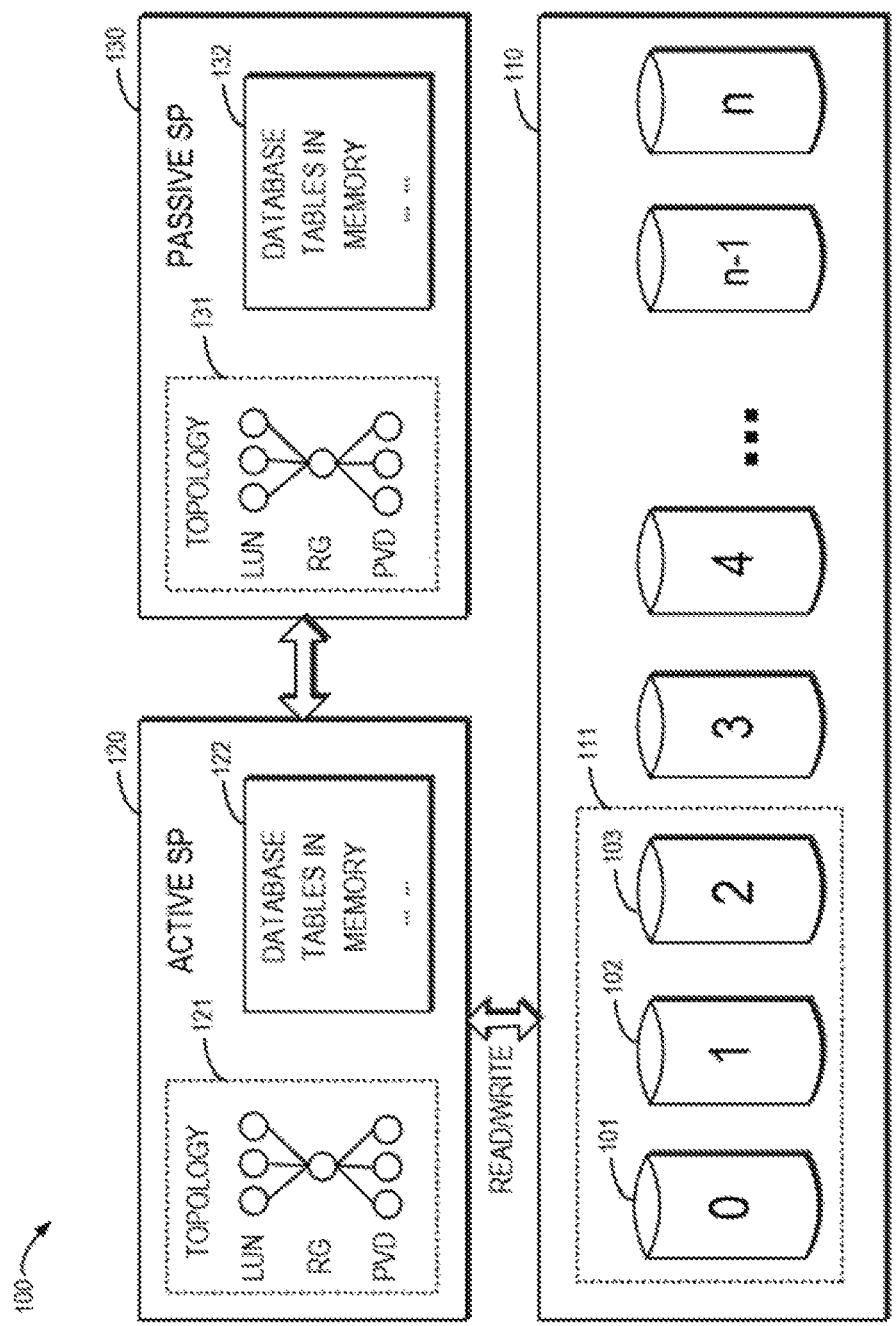
FIG. 1 schematically illustrates a diagram of a technical scenario of a RAID system in which the embodiments of the present disclosure can be implemented.

Principles and spirits of the present disclosure will now be described with reference to several example embodiments illustrated in the drawings. It should be appreciated that description of those embodiments is merely to enable those skilled in the art to better understand and further implement example embodiments disclosed herein and is not intended for limiting the scope disclosed herein in any manner.

FIG. 1 schematically illustrates a diagram of a technical scenario of a storage system 100 in which the embodiments of the present disclosure can be implemented. As shown in FIG. 1, the storage system 100 may include a RAID group 110 comprised by disks 0-n. When the storage system 100 is booted, the storage system 100 will load configuration data and metadata from the disks of the RAID group 110 and create an RG object, a LUN object and a PVD object in a memory.

As described above, the configuration data is vital and redundancy is required for storing into disks. In the example shown in FIG. 1, the configuration data is stored in disks 101, 102 and 103 and the data is generally protected with RAID 1 algorithm. It is to be understood that FIG. 1 only briefly shows units or components closely related to the present disclosure. In other embodiments, the storage system 100 may include or involve more units or components.

Specifically, in response to the booting of the storage system 100, an active storage processor (SP) 120 reads the configuration data of the storage system 100 from a raw mirror 111 including disks 101, 102 and 103, and forms a topology structure about the LUN, the RG, the PVD and so on in conjunction with relevant information in a module 122. Thereafter, the active SP 120 can access the disks 0-n by means of services provided by the RAID system normally. Furthermore, the active SP 120 is mirrored to a passive SP 130 as backup. When the active SP 120 has a failure, a user may operate the storage system 100 with the passive SP 130.

As described above, during the booting of the RAID system, the whole RAID system will be in an unavailable state. The inventor(s) notes that one of the reasons for this defect is that the system topology is not loaded and set up during the booting. It is impossible to create a RAID group object before the configuration data and metadata are loaded. Thus, it is necessary to first read the configuration data from raw disks storing the configuration data. However, the raw disks cannot provide the background service to protect data. For example, if the RAID system is writing the configuration data into the raw disks and one or two disks are offline during the writing, then data on the offline disks will be incorrect when the offline disks return to the RAID system later.

For example, during booting of the storage system 100, various functions of the RAID system are unable to be utilized when the configuration data of the system is read from the disks 101, 102 and 103 storing the configuration data. The reason is that the system topologies 121, 131 are still not loaded and setup at this time and that the RAID group object cannot be created before the configuration data and the metadata are loaded. Therefore, it is necessary to first read the configuration data from the raw disks 101, 102 and 103 storing the configuration data. However, the raw disks 101, 102 and 103 cannot provide the background service to protect data. For example, if the storage system 100 is writing configuration data into them and a disk (for example, disk 0) becomes offline during the writing, then data on the offline disk will be incorrect when the offline disk comes back to the storage system 100 later.

To solve the above and other potential problems at least in part, in accordance with the embodiments of the present disclosure, the configuration data of the RAID system can be read by selecting an access approach for the raw disks before the RAID group object is ready for operation. The embodiments of the present disclosure define metadata in each block of the raw disks 101, 102 and 103 for verifying data consistency. If data from the raw disks 101, 102 and 103 does not have same metadata, this means that stale data exists in mirror blocks. The method according to the embodiments of the present disclosure can help obtain the latest data. After the RAID system is setup with the configuration data, access paths of the raw disks 101, 102 and 103 can be switched to an interface of the RAID group 110. When the RAID system completes loading and setting, the RAID group object will be created to manage the disks 101, 102 and 103 containing system configuration. The method of managing a RAID system according to the embodiments of the present disclosure will be described specifically with reference to FIGS. 2-7.

Figure 2:
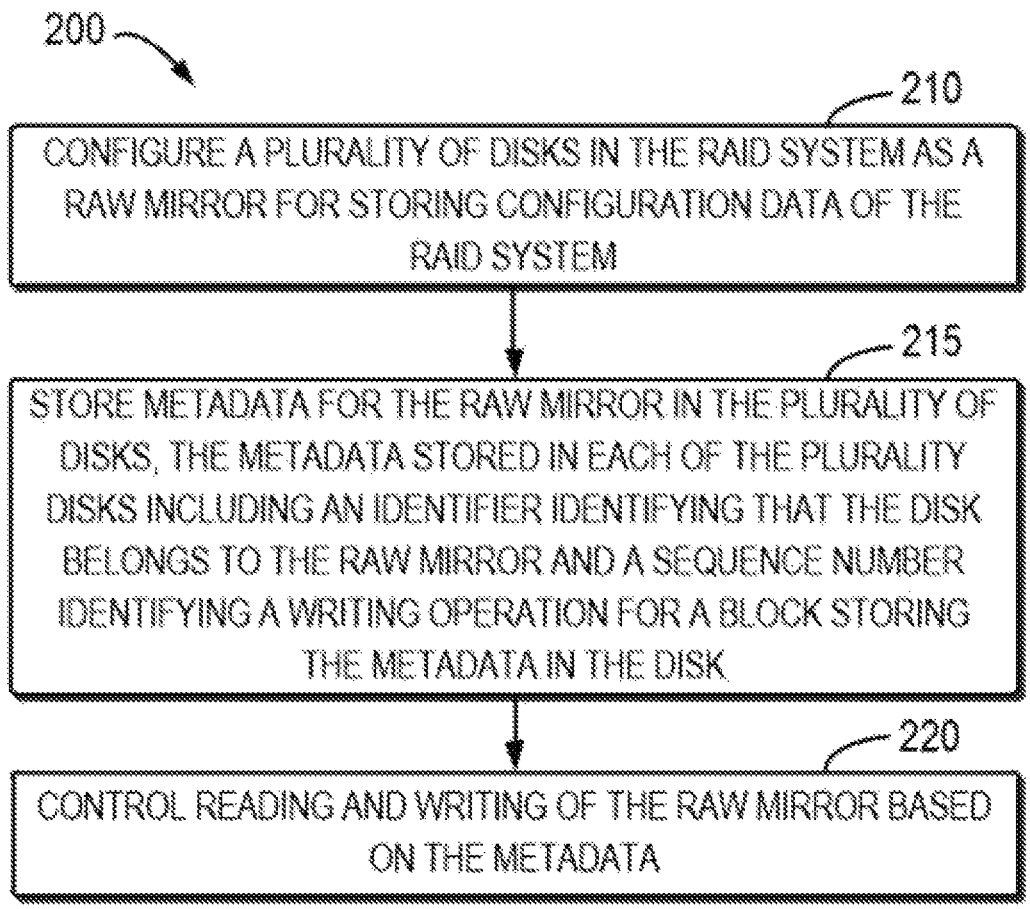
FIG. 2 schematically illustrates a flow chart of a method of managing a RAID system according to the embodiments of the present disclosure.

FIG. 2 schematically illustrates a flow chart of a method 200 of managing a RAID system according to the embodiments of the present disclosure. In some embodiments, the method 200 can be performed by the storage system 100 as depicted in FIG. 1, for example, by one or more units or modules in the storage system 100.

At 210, the storage system 100 configures its plurality of disks (such as disks 101, 102 and 103) as the raw mirror 111 for storing the configuration data of the RAID system. As used herein, the term "raw mirror" may refer to raw disks mirroring each other that are accessed without the system services provided by the storage system 100. For example, the raw mirror 111 may have a temporary raw mirror object for maintaining these raw disks and provide an I/O interface for the raw mirror 111 during the booting of the storage system 100. After the RAID group object of the storage system 100 is created, the raw mirror object for the raw mirror 111 can be disconnected from the raw disks. Then, the RAID group will take over the management of these disks and provide an I/O interface.

To manage the raw mirror 111, at 215, the storage system 100 stores metadata for the raw mirror 111 in a plurality of disks (such as the disks 101, 102 and 103) of the raw mirror 111. The metadata in each disk includes an identifier identifying that the disk belongs to the raw mirror, and a sequence number identifying a writing operation for a block storing the metadata in the disk. In this manner, the metadata will be used to verify consistency of the configuration data across all the disks (such as the disks 101, 102 and 103) in the raw mirror 111.

Figure 3:
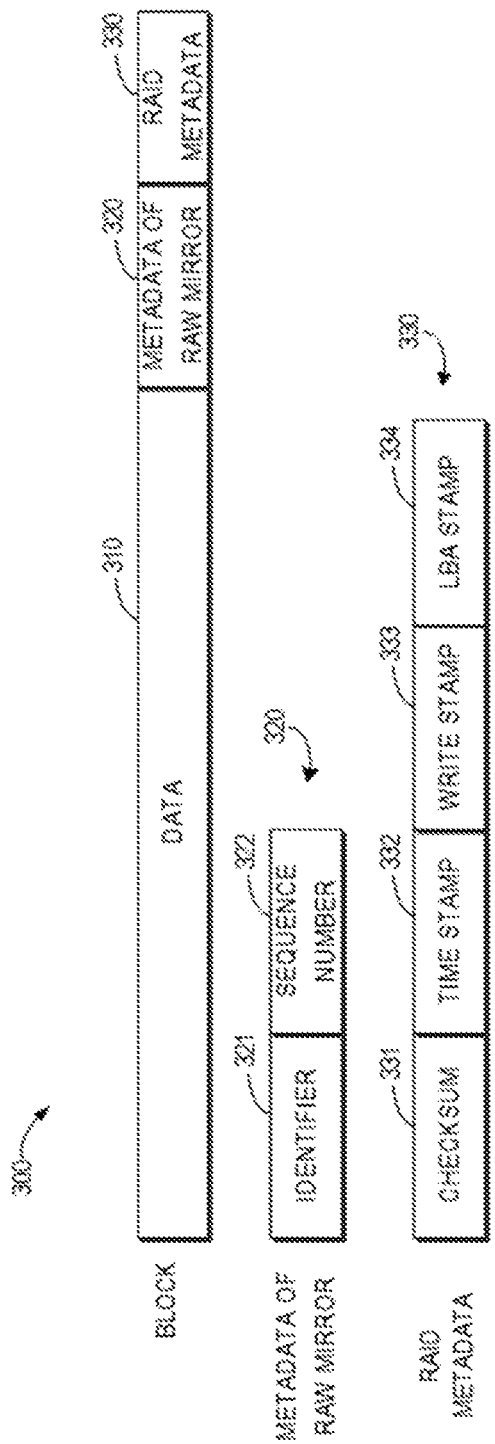
FIG. 3 schematically illustrates diagram of a block format of a raw disk in a raw mirror according to the embodiments of the present disclosure.

A possible block format that can be applied to the raw disks 101, 102 and 103 in the raw mirror 111 according to the embodiments of the present disclosure will be described in detail below in conjunction with FIG. 3. FIG. 3 schematically illustrates a diagram of a format of block 300 of the raw disks 101, 102 and 103 in the raw mirror 111 according to the embodiments of the present disclosure. As shown in FIG. 3, the block 300 of the raw disks 101, 102 and 103 may include data 310, raw mirror metadata 320 and RAID metadata 330, where the raw mirror metadata 320 can be dedicated to the raw mirror 111 while the RAID metadata 330 can be common metadata for the RAID group. In some embodiments, the size of the block 300 may be formatted as 520 bytes. It is to be understood that although the raw mirror metadata 320 and the RAID metadata 330 are located at an end of the block 300, in other embodiments, they can also be located elsewhere. The present disclosure is not limited in this regard.

Continuing to refer to FIG. 3, the raw mirror metadata 320 may include an identifier 321 and a sequence number 322 which can ensure that data 310 read from the raw disks 101, 102 and 103 by the storage system 100 are correct or consistent. The identifier 321 can also be called as "a magic number." When the storage system 100 writes data 310 into the blocks of the disks 101, 102 and 103 of the raw mirror 111 for the first time, the initial identifier 321 will be written in the blocks. The identifier 321 can be used to determine if a particular disk is a disk in the raw mirror 111.

Furthermore, when the storage system 100 writes data 310 into the blocks of the disks 101, 102 and 103 of the raw mirror 111 for the first time, the original sequence number 322 will be set. Thereafter, the sequence number 322 will be increased (for example, progressively) each time when written into the block. Thus, the data 310 in the corresponding blocks of the disks 101, 102 and 103 should have a same sequence number 322. If not, the storage system 100 should select data 310 with the highest sequence number 322.

In some embodiments, in addition to the raw mirror metadata 320, the block 300 can be configured with RAID metadata 330 at the end to verify the integrity of data 310. The RAID metadata 330 is necessary to implement the RAID storage system and is not dedicated for the raw mirror 111. Referring to FIG. 3, the RAID metadata 330 may include a checksum 331, a time stamp 332, a write stamp 333 and a logic block address (LBA) stamp 334. The checksum 331 field can be calculated with the data 310 of the block 300 to check the integrity of the data 310 of the block 300. The time stamp 332 field can be utilized by some functions (such as the MR3 write) of the RAID 3/5/6. The write stamp 333 field can be utilized by some other functions (such as the 468 write) of RAID 3/5/6. The LBA stamp 334 can be used to confirm the disk LBA.

In some embodiments, the storage system 100 can create a raw mirror object for the raw mirror 111 to manage the raw mirror 111. The raw mirror object may include a block size of the raw mirror, an edge array pointing to the raw mirror, a RAID algorithm of the raw mirror, an access switch of the raw mirror, a capacity of the raw mirror, and so on. This creating can be done in initialization of the raw mirror 111. The following table shows an example of the raw mirror object.

| Field | Note |
| --- | --- |
| fbe_block_edge_t * edge[3] | The route to the raw disks |
| fbe_block_size_t block_size | The block size of the raw disks |
| fbe_raid_group_type_t raid_type | The RAID type defining the RAID algorithm |
| fbe_bool_t quiesce_flag; | The switch for I/O requests |
| fbe_block_size_t capacity | The raw mirror capacity |

In the above table, the block size, which can be initialized with disk information, is the block size of the raw disks 101, 102 and 103 in the raw mirror 111 with a possible default value of 520 bytes. The raw disk array is recorded by edges and the edge array can point to the raw disks 101, 102 and 103. When sending an I/O to the raw disks, the raw mirror 111 can send data to a particular disk with the edge array. The RAID algorithm can be defined by the RAID array and it informs RAID bank how to read data from and write data to the raw disks 101, 102 and 103. In some embodiments, the RAID 1 algorithm can be used, where all the data is needed to be written into/read from all the disks 101, 102 and 103. The switch for I/O requests can be used to switch off the raw mirror interface after being switched to the RAID group object. The capacity of the raw mirror 111 can be defined and this capacity may not include the metadata capacity of the RAID group 110.

Returning to refer to FIG. 2, after defining and configuring of the raw mirror metadata 320 are completed, at 220, the storage system 100 may control reading and writing of the raw mirror 111 based on the raw mirror metadata 320.

For example, during the process of writing the data 310 into the raw mirror 111, the storage system 100 may set the identifiers 321 of the raw mirror metadata 320 of the plurality of disks (such as the disks 101, 102 and 103) of the raw mirror 111. Moreover, the storage system 100 can increase the sequence numbers 322 of the raw mirror metadata 320, for example, progressively. After that, the storage system 100 can write the configuration data 310 into the corresponding blocks 300 of the plurality of disks. In some embodiments, the storage system 100 can calculate the checksum 331 with block the data 310 and set the LBA stamp 334 according to the disk LBA.

On the other hand, during the process of reading the data 310 from the raw mirror 111, the storage system 100 can check the identifiers 321 of the plurality of disks of the raw mirror 111, compare the sequence numbers 322 of corresponding blocks 300 of the plurality of disks, and read the configuration data 310 from the corresponding block 300 of the disk with the identifier 321 and a maximum sequence number 322. An example for reading the data 310 from the raw mirror 111 will be described below in conjunction with FIG. 4.

Figure 4:
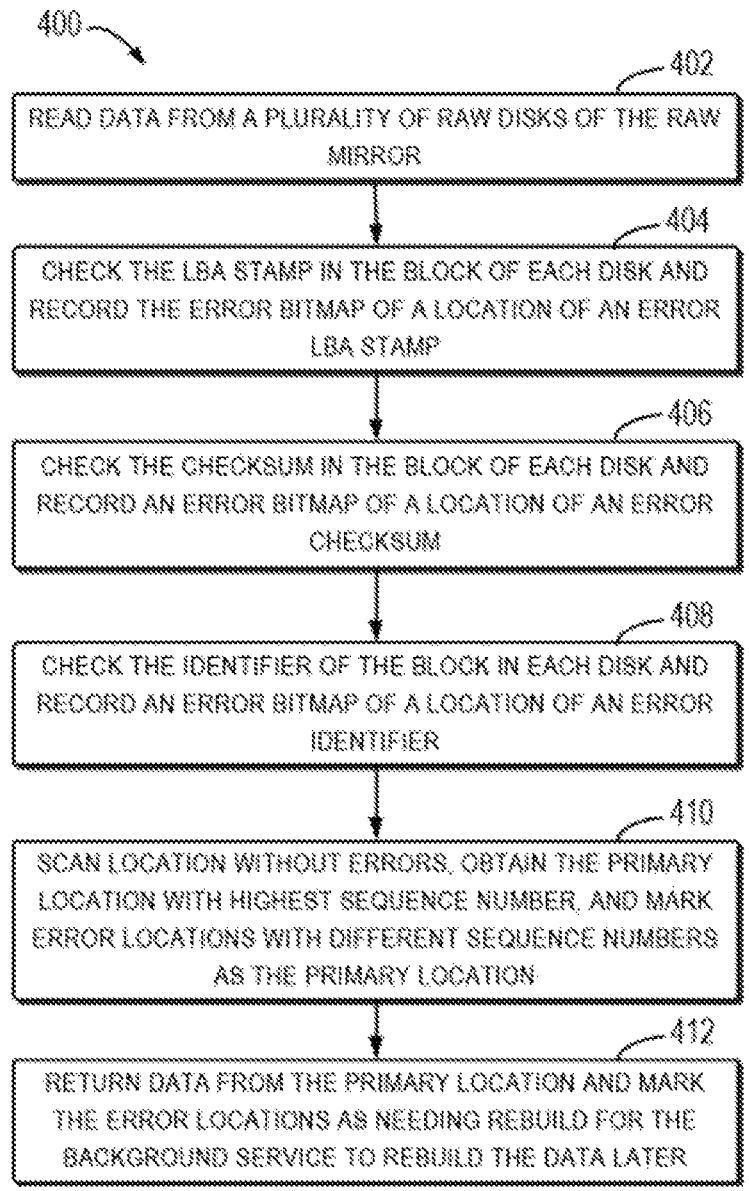
FIG. 4 schematically illustrates a process of a reading operation of the method of managing the RAID system according to the embodiments of the present disclosure.

FIG. 4 schematically illustrates a process for a reading operation of the method of managing the storage system 100 according to the embodiments of the present disclosure. When the data 310 is read from an access interface of the raw mirror 111, it is not proper to only read data from one driver as in the RAID 1 algorithm. Instead, all the disks 101, 102 and 103 should be read and data 310 needs to be checked across the disks 101, 102 and 103. The reason is that data 310 should be read from three data copies and their sequence numbers 322 are to be compared. If this comparison is not performed, it is possible to obtain stale data.

As shown in FIG. 4, at 402, the storage system 100 may read the data 310 from the plurality of raw disks of the raw mirror 111. At 404, the storage system 100 may check the LBA stamp 334 of the block of each disk. If the LBA stamp 334 is incorrect, then the driver error bitmap is marked. At 406, the storage system 100 may check the checksum 331 of the block on each disk. If the checksum 331 is wrong, then the driver error bitmap is marked. At 408, the storage system 100 may check the identifier 321 of the block on each disk. If they do not match, this means that the block data does not belong to the raw mirror 111. At 410, the storage system 100 may compare sequence numbers 322 of blocks on the disks and then select the block with the maximum sequence number 322. If the sequence numbers 322 are different, then the storage system 100 may mark other disks as having error on the bitmap. At 412, if the wrong bitmap is correctable, then the storage system 100 may mark the block as requiring to be rebuilt and the background service will recover the data later.

In some embodiments, the storage system 100 can obtain the sequence numbers 322 of corresponding blocks of the plurality of disks 101, 102 and 103 responsive to the booting of the RAID system; compare the sequence numbers 322 of the corresponding blocks of the plurality of disks 101, 102 and 103; and store the maximum sequence number 322 in a cache as the latest sequence numbers 322 for the corresponding blocks. In these embodiments, the storage system 100 can obtain the latest sequence numbers 322 for the corresponding blocks of a plurality of disks from the cache; increase the latest sequence numbers 322 progressively; store the progressively increased latest sequence numbers 322 into the plurality of disks 101, 102 and 103; and write the configuration data 310 into the corresponding blocks of the plurality of disks 101, 102 and 103. Furthermore, since the raw mirror 111 or the RAID group 110 only accesses disks on the active SP 120, when the active SP 120 has a failure or is shut down, the cache for all the blocks need to be read to rebuild the sequence number 322 before the passive SP 130 is promoted as active.

Figure 5:
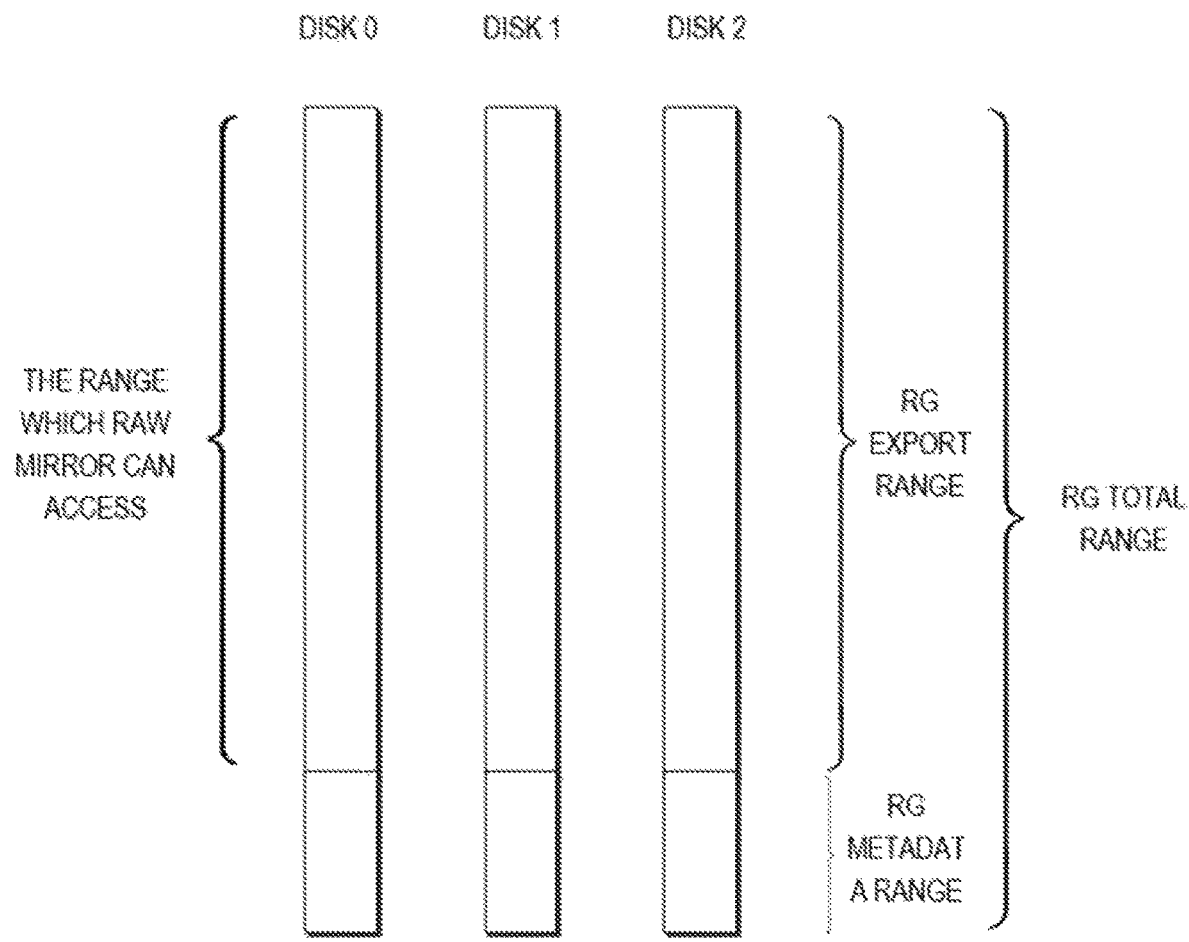
FIG. 5 schematically illustrates a diagram of creating a RAID group object for a raw mirror according to the embodiments of the present disclosure.

In some embodiments, the storage system 100 can create a RAID group object for the raw mirror 111 to manage the raw mirror 111, so as to perform self-management with the background service in the RAID system. Since the RAID group object has the background service to maintain health of the object, the background service of the RAID group 110 can be utilized to maintain management and operations for the raw mirror 111 after the RAID system is configured. FIG. 5 schematically illustrates a diagram of creating a RAID group object for the raw mirror 111 according to the embodiments of the present disclosure.

As shown in FIG. 5, the RAID group 110 will employ more space to store its metadata which can be used to mark if a driver needs to be rebuilt and verified. For example, if a disk becomes offline when data is written into the RAID group 110, the RAID group 110 can mark in the metadata that the offline driver needs to be rebuilt. Later, if the offline driver resumes, the data can be reconstructed.

After the RAID group object of the RAID system is created, the storage system 100 may switch an access interface of the raw mirror 111 from the raw mirror object to the RAID group object. For example, when the RAID group object is ready for I/O services, the storage system 100 can switch the access interface from the raw mirror 111 to the RAID group. Before the switching is performed, the raw mirror 111 still serves I/O requests for the raw disks 101, 102 and 103. Then, the raw mirror object of the raw mirror 11 can set a field indicating I/O quiescence (such as the quiesce_flag) as true. After that, the raw mirror 111 waits for completion of all the ongoing I/Os. Finally, the access interface connected to the raw mirror object can be switched to the RAID group.

Figure 6:
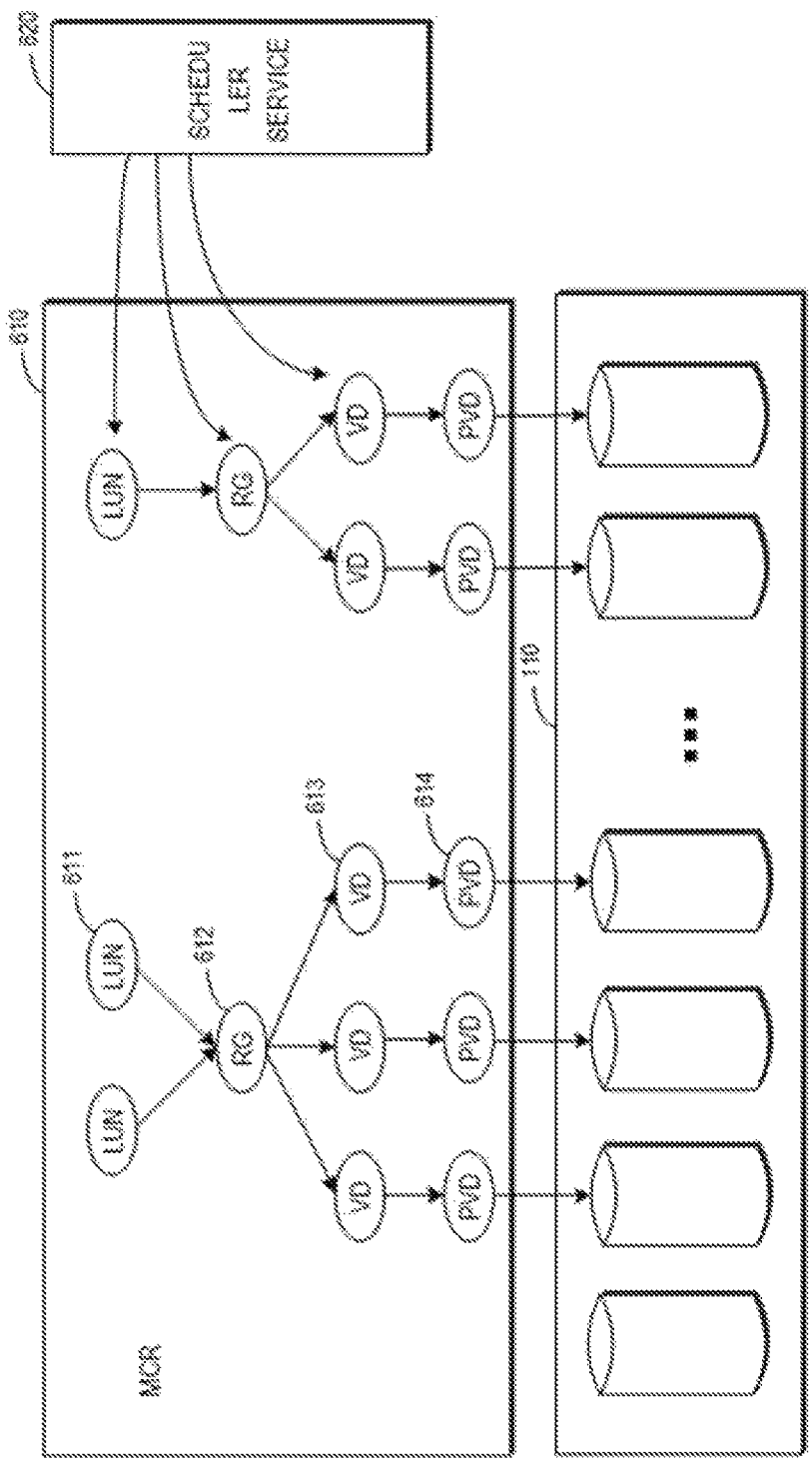
FIG. 6 schematically illustrates a diagram of managing a RAID group object with a background service of the RAID system according to the embodiments of the present disclosure.

After the switching from the raw mirror object to the RAID group object is completed, the storage system 100 can utilize the background service of the RAID group 110 for management of the disks 101, 102 and 103. FIG. 6 schematically illustrates a diagram of managing the RAID group object with the background service of the RAID group 110 according to the embodiments of the present disclosure.

As shown in FIG. 6, a multi-core RAID driver (called as MCR) 610 may manage the disks in the RAID group 110 and a RAID group 612/LUN object 611. The RAID group 110 may be created to implement the RAID algorithm. Outside the topology, a scheduler service 620 may provide a scheduler thread to monitor health status of the RAID group object. The scheduler thread may monitor the life cycle of the RAID group 110 and perform a background operation on the RAID group 110. The background operation may include driver swapping, data rebuilding, data verification, and so on.

For example, assuming that a disk in the RAID group 110 has a failure, the RAID group object 612 can set a time stamp. The scheduler thread can check and view the state of the RAID group 110. After a period of time (for instance, 5 minutes), if the failed disk is not recovered, then the RAID group 110 can swap a new disk and perform data rebuilding for the new disk with the rest of the working disks. This process can be called as disk swapping and data rebuilding. Therefore, each object in the topology shown in FIG. 6 can manage the health status of the object by itself.

Figure 7:
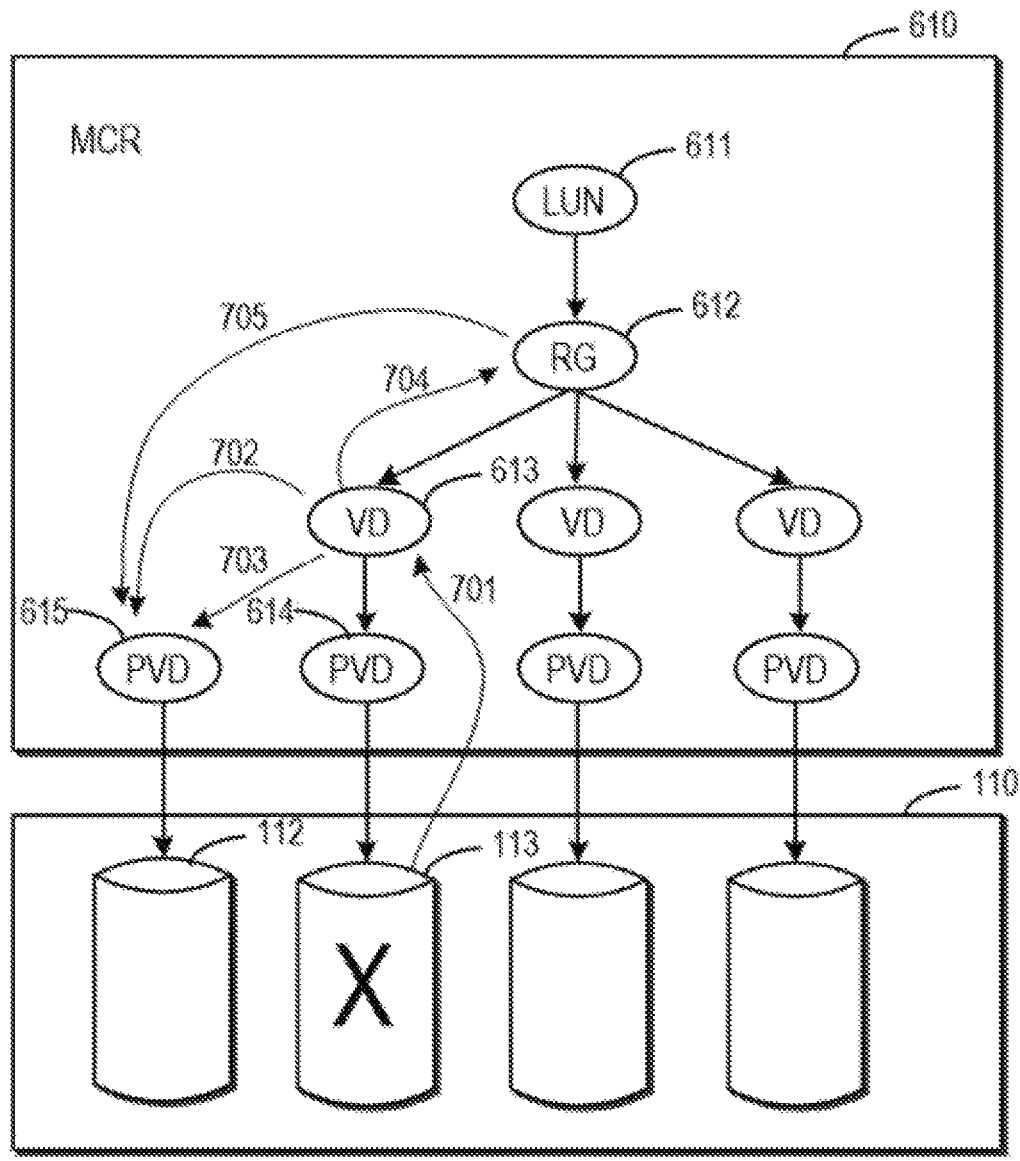
FIG. 7 schematically illustrates a diagram of driver swapping of the RAID group object with the background service of the RAID system according to the embodiments of the present disclosure.

More generally, the storage system 100 can perform at least one of driver swapping, data rebuilding, data verification, or data replication for the RAID group object of the raw mirror 111 with its background service. This process will be described in detail in the following with driver swapping as an example. FIG. 7 schematically illustrates a diagram of driver swapping for the RAID group object with the background service of the RAID system according to the embodiments of the present disclosure. The MCR 610 can perform corresponding operations on the RAID group 110 and it can store topological relations between the LUN 611, the RG 612, the virtual drive (VD) 613 and a PVD 614, where the VD 613 is arranged above the PVD and accomplishes the functions of hot spare, replication and the like, and can be considered as a virtual disk for the RG. It is to be understood that the topological relations depicted in FIG. 7 are only an example, without intention to limit the scope of the present disclosure in any manner.

When the background service of the RAID group detects that a disk in the RAID group 110 has a failure, the background service may set a timer. After the timer is triggered, the background service may swap in a new disk to replace the failed disk. Specifically, when a disk fails, it propagates a disk failure event upstream. When the RG 612/VD 613 receives the event, it may select a disk without failure and swap it in.

As shown in FIG. 7, at 701, a disk 113 in the RAID group 110 fails. The event is propagated to the upstream object VD 613 which is a virtual driver object for managing disk swapping. At 702, after receiving the disk failure event, the VD 613 sets a failure time stamp. If the failed disk recovers before timeout, it can be connected again. However, if the failed disk does not recover for a long time, the VD 613 can select another unused disk 113 without failure from the RAID group 110 according to hot spare policy. At 703, the VD 613 is connected to the PVD object 615 of the new disk 113. Meanwhile, it updates the edge of the new driver to the raw mirror information so that the raw mirror 111 may know that the edge has been changed to the new driver 113. At 704, the VD 613 may send an event to the RAID group 110 to inform that it is ready for using the new driver 113. At 705, the RAID group 110 starts rebuild operation on data with its background service.

Figure 8:
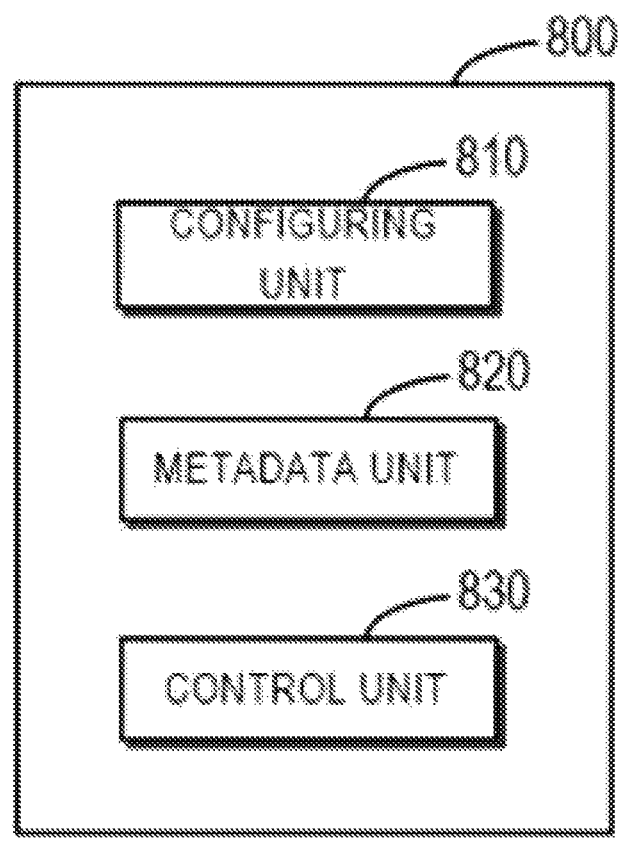
FIG. 8 schematically illustrates a block diagram of a managing apparatus of the RAID system according to the embodiments of the present disclosure.

FIG. 8 schematically illustrates a block diagram of a managing apparatus 800 for the RAID system according to the embodiments of the present disclosure. Those skilled in the art would appreciate that FIG. 8 only illustrates units or components of the apparatus 800 that are closely related to the present disclosure. In some embodiments, the apparatus 800 may further include other functional units or components that enable its normal operation. Furthermore, the various units or components shown in FIG. 8 may have necessary connection relations. However, for the sake of simplicity, such connection relations are not depicted in FIG. 8. In some embodiments, the apparatus 800 can be configured to perform the storage management method 200 depicted above in conjunction with FIG. 2.

As shown in FIG. 8, the apparatus 800 includes a configuring unit 810, a metadata unit 820 and a control unit 830. The configuring unit 810 is arranged to configure a plurality of disks in the RAID system as a raw mirror for storing configuration data of the RAID system. The metadata unit 820 is configured to store metadata for the raw mirror in the plurality of disks. The metadata stored in each disk includes an identifier identifying that the disk belongs to the raw mirror and a sequence number identifying a writing operation for a block storing the metadata in the disk. The control unit 830 is configured to control reading and writing of the raw mirror based on the metadata.

In some embodiments, the control unit 830 can be further configured to set the identifiers for the plurality of disks, increase the sequence numbers in the plurality of disks progressively, and write the configuration data into corresponding blocks of the plurality of disks. In some embodiments, the control unit 830 can be further configured to check the identifiers for the plurality of disks, compare the sequence numbers of corresponding blocks of the plurality of disks, and read the configuration data from the corresponding block of the disk with the identifier and a maximum sequence number.

In some embodiments, the metadata unit 820 can be further configured to obtain the sequence numbers of corresponding blocks of the plurality of disks in response to booting of the RAID system, compare the sequence numbers of the corresponding blocks of the plurality of disks, and store a maximum sequence numbers in a cache as the latest sequence numbers for the corresponding blocks. In these embodiments, the control unit 830 can be further configured to obtain from the cache the latest sequence numbers for the corresponding blocks of the plurality of disks, increase the latest sequence numbers progressively, store the progressively increased latest sequence numbers into the plurality of disks, and write the configuration data into the corresponding blocks of the plurality of disks.

In some embodiments, the configuring unit 810 can be further configured to create a raw mirror object for the raw mirror to manage the raw mirror. The raw mirror includes at least one of a block size of the raw mirror, an edge array pointing to the raw mirror, a RAID algorithm of the raw mirror, an access switch for the raw mirror, and a capacity of the raw mirror. In some embodiments, the configuring unit 810 can be further configured to create a RAID group object for the raw mirror to manage the raw mirror.

In some embodiments, the control unit 830 can be further configured to switch an access interface of the raw mirror from the raw mirror object to the RAID group object. In these embodiments, the control unit 830 can be further configured to perform at least one of driver swapping, data rebuilding, data verification or data replication on the RAID group object with a background service of the RAID system.

Figure 9:
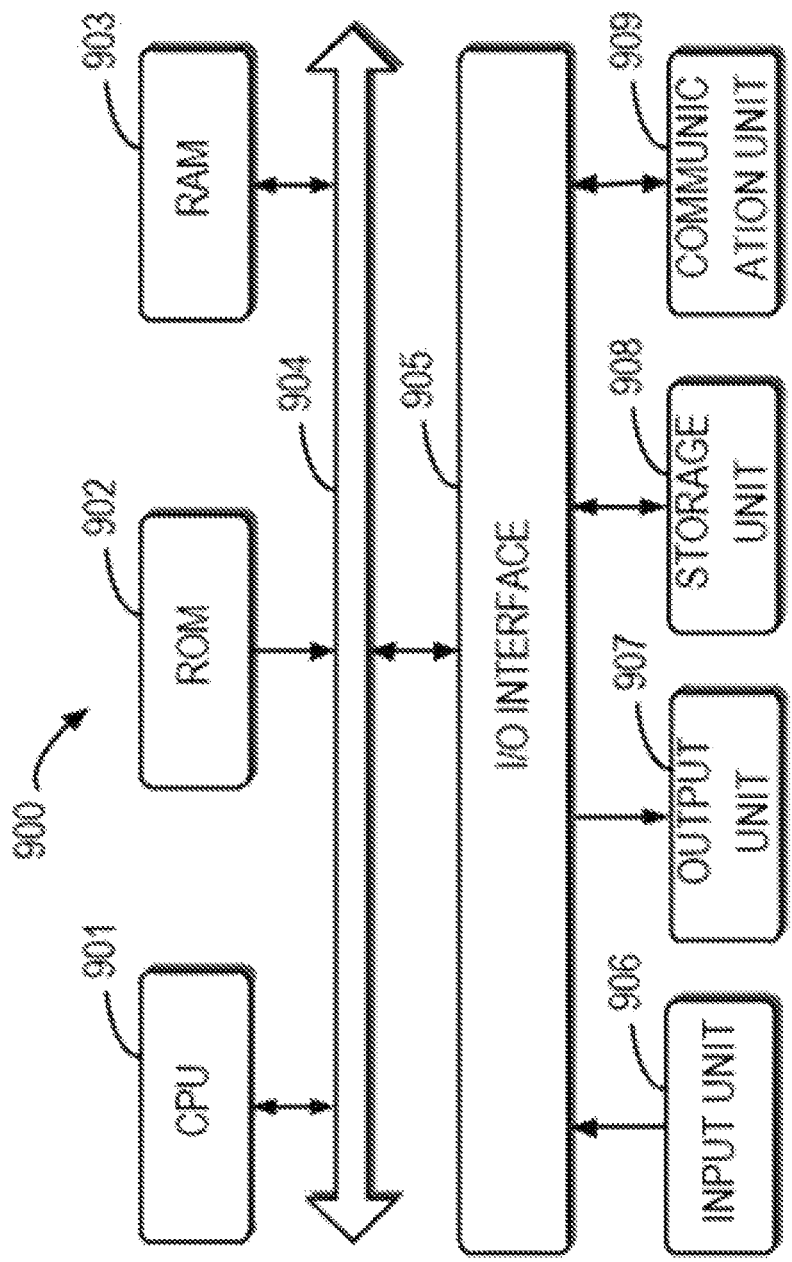
FIG. 9 schematically illustrates a block diagram of a device that can be used to implement the embodiments of the present disclosure.

FIG. 9 schematically illustrates a block diagram of an apparatus 900 that can be used to implement the embodiments of the present disclosure. As shown in FIG. 9, apparatus 900 includes a Central Processing Unit (CPU) 901 which can perform various appropriate actions and processing based on computer program instructions stored in Read Only Memory (ROM) 902 or computer program instructions uploaded from storage unit 908 to the Random Access Memory (RAM) 903. In RAM 903, there further stores various programs and data needed by operation of the storage apparatus 900. CPU 901, ROM 902 and RAM 903 are connected one another via a bus 904. The input/output (I/O) interface 905 can also be connected to the bus 904.

A plurality of components in apparatus 900 are connected to the I/O interface 905, including: an input unit 906, such as a keyboard, a mouse, and the like; an output unit 907, such as display of various types and loudspeakers; a storage unit 908, such as a magnetic disk and an optical disk; a communication unit 909, such as a network card, a modem, a wireless communication transceiver and so on. Communication unit 909 allows device 900 to exchange information/data with other devices via computer networks, such as Internet, and/or various telecommunication networks.

The processes and processing described above, method 200 for instance, can be performed by a processing unit 901. For example, in some embodiments, method 200 can be implemented as a computer software program which is corporeally contained in a machine readable medium, such as storage unit 908. In some embodiments, the computer program can be partly or wholly loaded and/or mounted on device 900 by ROM 902 and/or communication unit 909. When the computer program is uploaded to RAM 903 and executed by CPU 701, one or more steps of method 200 described above can be executed.

In the present disclosure, there is described a new type of self-management method for storing system object configuration. The method provides an N-way mirror RAID level protection for system configuration. To perform this kind of N-way mirror protection, new block metadata is defined for raw disks at the block end of each raw disk. When reading data in the raw disks, the metadata will be used to verify consistency of the configuration data across all the raw disks in the N-way mirror.

The method can manage data integrity of raw disks on the array booting path before the system configuration is loaded. After the system configuration is loaded, any RAID protection (including this N-way mirror) state/internal metadata maintenance will be switched to the RAID group object automatically. After the system is loaded, it will create a normal RAID group object to manage these raw disks. This RAID group object can provide background services for all the RAID groups to protect disk data, including hot spare, data rebuilding, data verification, data copy, and so on.

As used herein, the term "includes" and its variants are to be read as open-ended terms that mean "includes, but is not limited to." The term "based on" is to be read as "based at least in part on." The term "one example embodiment" or "the example embodiment" is to be read as "at least one example embodiment." As used herein, the term "determine" covers various actions. For example, "determine" may include computing, calculating, processing, deriving, examining, looking up (such as look up in a table, a database or another data structure), finding out and so on. Furthermore, "determine" may include receiving (such as receiving information), accessing (such as access data in the memory) and so on. Meanwhile, "determine" may include analyzing, choosing, selecting, creating and the like.

It will be noted that the embodiments of the present disclosure can be implemented in software, hardware, or a combination thereof. The hardware part can be implemented by a special logic; the software part can be stored in a memory and executed by a suitable instruction execution system such as a microprocessor or special purpose hardware. Ordinary skilled in the art may understand that the above method and system may be implemented with computer executable instructions and/or in processor-controlled code, for example, such code is provided on such as a programmable memory or a data bearer such as an optical or electronic signal bearer.

Further, although operations of the present methods are described in a particular order in the drawings, it does not require or imply that these operations are necessarily performed according to this particular sequence, or a desired outcome can only be achieved by performing all shown operations. On the contrary, the execution order for the steps as depicted in the flowcharts may be varied. Alternatively, or in addition, some steps may be omitted, a plurality of steps may be merged into one step, or a step may be divided into a plurality of steps for execution. It should also be noted that the features and functions of the above described two or more units may be embodied in one means. In turn, the features and functions of the above described one means may be further embodied in more units.

Although the present disclosure has been described with reference to various embodiments, it should be understood that the present disclosure is not limited to the disclosed embodiments. The present disclosure is intended to cover various modifications and equivalent arrangements included in the spirit and scope of the appended claims.

We claim:

1. A method of managing a redundant array of independent disks (RAID) system, comprising:
    configuring a plurality of disks in the RAID system as a raw mirror for storing configuration data of the RAID system;
    storing metadata for the raw mirror in the plurality of disks, the metadata stored in each of the plurality of disks including:
        an identifier identifying that the disk belongs to the raw mirror, and
        a sequence number identifying a writing operation for a block storing the metadata in the disk;
    controlling reading and writing of the raw mirror based on the metadata; and
    creating a raw mirror object for the raw mirror to manage the raw mirror, the raw mirror object including at least one of a block size of the raw mirror, an edge array pointing to the raw mirror, a RAID algorithm of the raw mirror, an access switch for the raw mirror, or a capacity of the raw mirror.

2. The method of claim 1, wherein controlling reading and writing of the raw mirror based on the metadata comprises:

setting the identifiers in the plurality of disks;
increasing the sequence numbers in the plurality of disks; and
writing the configuration data into corresponding blocks of the plurality of disks.

3. The method of claim 1, wherein controlling reading and writing of the raw mirror based on the metadata comprises:
checking the identifiers in the plurality of disks;
comparing the sequence numbers of corresponding blocks of the plurality of disks; and
reading the configuration data from the corresponding block of the disk with a maximum sequence number.

4. The method of claim 1, further comprising:
in response to booting of the RAID system, obtaining the sequence numbers of corresponding blocks of the plurality of disks;
comparing the sequence numbers of the corresponding blocks of the plurality of disks; and
storing a maximum sequence number in a cache as the latest sequence numbers for the corresponding blocks.

5. The method of claim 4, wherein controlling reading and writing of the raw mirror based on the metadata comprises:
obtaining from the cache the latest sequence numbers for the corresponding blocks of the plurality of disks;
increasing the latest sequence numbers;
storing the increased latest sequence numbers into the plurality of disks; and
writing the configuration data into the corresponding blocks of the plurality of disks.

6. The method of claim 1, further comprising:
creating a RAID group object for the raw mirror to manage the raw mirror.

7. The method of claim 6, further comprising:
switching an access interface of the raw mirror from the raw mirror object to the RAID group object.

8. The method of claim 6, further comprising:
performing, with a background service of the RAID system, at least one of driver swapping, data rebuilding, data verification, or data replication on the RAID group object.

9. An electronic device, comprising:
at least one processor, and
at least one memory including computer program instructions, the at least one memory and the computer program instructions configured, with the processor, to cause the device to:
configure a plurality of disks in a redundant array of independent disks (RAID) system as a raw mirror for storing configuration data of the RAID system;
store metadata for the raw mirror in the plurality of disks, the metadata stored in each of the plurality of disks including:
an identifier identifying that the disk belongs to the raw mirror, and
a sequence number identifying a writing operation for a block storing the metadata in the disk;
control reading and writing of the raw mirror based on the metadata; and
create a raw mirror object for the raw mirror to manage the raw mirror, the raw mirror object including at least one of a block size of the raw mirror, an edge array pointing to the raw mirror, a RAID algorithm of the raw mirror, an access switch for the raw mirror, or a capacity of the raw mirror.

10. The device of claim 9, wherein the at least one memory and the computer program instructions are further configured, with the processor, to cause the device to control reading and writing of the raw mirror by:
setting the identifier in the plurality of disks;
increasing the sequence numbers in the plurality of disks; and
writing the configuration data into corresponding blocks of the plurality of disks.

11. The device of claim 9, wherein the at least one memory and the computer program instructions are further configured, with the processor, to cause the device to control reading and writing of the raw mirror by:
checking the identifiers in the plurality of disks;
comparing the sequence numbers of corresponding blocks of the plurality of disks; and
reading the configuration data from the corresponding block of the disk with a maximum sequence number.

12. The device of claim 9, wherein the at least one memory and the computer program instructions are further configured, with the processor, to cause the device to:
in response to booting of the RAID system, obtain the sequence numbers of corresponding blocks of the plurality of disks;
compare the sequence numbers of the corresponding blocks of the plurality of disks; and
store a maximum sequence number in a cache as the latest sequence numbers for the corresponding blocks.

13. The device of claim 12, wherein the at least one memory and the computer program instructions are further configured, with the processor, to cause the device to control reading and writing of the raw mirror by:
obtaining from the cache the latest sequence numbers for the corresponding blocks of the plurality of disks;
increasing the latest sequence numbers;
storing the increased latest sequence numbers into the plurality of disks; and
writing the configuration data into the corresponding blocks of the plurality of disks.

14. The device of claim 9, wherein the at least one memory and the computer program instructions are further configured, with the processor, to cause the device to:
create a RAID group object for the raw mirror to manage the raw mirror.

15. The device of claim 14, wherein the at least one memory and the computer program instructions are further configured, with the processor, to cause the device to:
switch an access interface of the raw mirror from the raw mirror object to the RAID group object.

16. The device of claim 14, wherein the at least one memory and the computer program instructions are further configured, with the processor, to cause the device to:
perform, with a background service of the RAID system, at least one of driver swapping, data rebuilding, data verification, or data replication on the RAID group object.

17. A computer program product for managing a redundant array of independent disks (RAID) system, the computer program product comprising:
a non-transitory computer readable medium encoded with computer-executable program code for indicating the search result, wherein the code is configured to enable the execution of:
configuring a plurality of disks in the RAID system as a raw mirror for storing configuration data of the RAID system;
storing metadata for the raw mirror in the plurality of disks, the metadata stored in each of the plurality of disks including:

an identifier identifying that the disk belongs to the raw mirror, and
a sequence number identifying a writing operation for a block storing the metadata in the disk;
controlling reading and writing of the raw mirror based on the metadata; and
creating a raw mirror object for the raw mirror to manage the raw mirror, the raw mirror object including at least one of a block size of the raw mirror, an edge array pointing to the raw mirror, a RAID algorithm of the raw mirror, an access switch for the raw mirror, or a capacity of the raw mirror.

18. The computer program product of claim 17, wherein controlling reading and writing of the raw mirror based on the metadata comprises:
setting the identifiers in the plurality of disks;
increasing the sequence numbers in the plurality of disks; and
writing the configuration data into corresponding blocks of the plurality of disks.

19. A method of managing a redundant array of independent disks (RAID) system, comprising:
configuring a plurality of disks in the RAID system as a raw mirror for storing configuration data of the RAID system;
storing metadata for the raw mirror in the plurality of disks, the metadata stored in each of the plurality of disks including:
an identifier identifying that the disk belongs to the raw mirror, and
a sequence number identifying a writing operation for a block storing the metadata in the disk; and
controlling reading and writing of the raw mirror based on the metadata;
wherein controlling reading and writing of the raw mirror based on the metadata comprises:
checking the identifiers in the plurality of disks;
comparing the sequence numbers of corresponding blocks of the plurality of disks; and
reading the configuration data from the corresponding block of the disk with a maximum sequence number.

20. A method of managing a redundant array of independent disks (RAID) system, comprising:
configuring a plurality of disks in the RAID system as a raw mirror for storing configuration data of the RAID system;
storing metadata for the raw mirror in the plurality of disks, the metadata stored in each of the plurality of disks including:
an identifier identifying that the disk belongs to the raw mirror, and
a sequence number identifying a writing operation for a block storing the metadata in the disk; and
controlling reading and writing of the raw mirror based on the metadata;
in response to booting of the RAID system, obtaining the sequence numbers of corresponding blocks of the plurality of disks;
comparing the sequence numbers of the corresponding blocks of the plurality of disks; and
storing a maximum sequence number in a cache as the latest sequence numbers for the corresponding blocks.

21. The method of claim 20, wherein controlling reading and writing of the raw mirror based on the metadata comprises:
obtaining from the cache the latest sequence numbers for the corresponding blocks of the plurality of disks;
increasing the latest sequence numbers;
storing the increased latest sequence numbers into the plurality of disks; and
writing the configuration data into the corresponding blocks of the plurality of disks.

22. An electronic device, comprising:
at least one processor, and
at least one memory including computer program instructions, the at least one memory and the computer program instructions configured, with the processor, to cause the device to:
configure a plurality of disks in a redundant array of independent disks (RAID) system as a raw mirror for storing configuration data of the RAID system;
store metadata for the raw mirror in the plurality of disks, the metadata stored in each of the plurality of disks including:
an identifier identifying that the disk belongs to the raw mirror, and
a sequence number identifying a writing operation for a block storing the metadata in the disk; and
control reading and writing of the raw mirror based on the metadata;
wherein the at least one memory and the computer program instructions are further configured, with the processor, to cause the device to control reading and writing of the raw mirror by:
checking the identifiers in the plurality of disks;
comparing the sequence numbers of corresponding blocks of the plurality of disks; and
reading the configuration data from the corresponding block of the disk with the identifier and a maximum sequence number.

23. An electronic device, comprising:
at least one processor, and
at least one memory including computer program instructions, the at least one memory and the computer program instructions configured, with the processor, to cause the device to:
configure a plurality of disks in a redundant array of independent disks (RAID) system as a raw mirror for storing configuration data of the RAID system;
store metadata for the raw mirror in the plurality of disks, the metadata stored in each of the plurality of disks including:
an identifier identifying that the disk belongs to the raw mirror, and
a sequence number identifying a writing operation for a block storing the metadata in the disk;
control reading and writing of the raw mirror based on the metadata;
in response to booting of the RAID system, obtain the sequence numbers of corresponding blocks of the plurality of disks;
compare the sequence numbers of the corresponding blocks of the plurality of disks; and
store a maximum sequence number in a cache as the latest sequence numbers for the corresponding blocks.

24. The device of claim 23, wherein the at least one memory and the computer program instructions are further configured, with the processor, to cause the device to control reading and writing of the raw mirror by:
obtaining from the cache the latest sequence numbers for the corresponding blocks of the plurality of disks;
increasing the latest sequence numbers;

storing the increased latest sequence numbers into the plurality of disks; and writing the configuration data into the corresponding blocks of the plurality of disks.

25. A computer program product for managing a redundant array of independent disks (RAID) system, the computer program product comprising:

a non-transitory computer readable medium encoded with computer-executable program code for indicating the search result, wherein the code is configured to enable the execution of:

configuring a plurality of disks in the RAID system as a raw mirror for storing configuration data of the RAID system;

storing metadata for the raw mirror in the plurality of disks, the metadata stored in each of the plurality of disks including:

an identifier identifying that the disk belongs to the raw mirror, and a sequence number identifying a writing operation for a block storing the metadata in the disk; and controlling reading and writing of the raw mirror based on the metadata;

wherein controlling reading and writing of the raw mirror based on the metadata comprises:

checking the identifiers in the plurality of disks;

comparing the sequence numbers of corresponding blocks of the plurality of disks; and reading the configuration data from the corresponding block of the disk with a maximum sequence number.

26. A computer program product for managing a redundant array of independent disks (RAID) system, the computer program product comprising:

a non-transitory computer readable medium encoded with computer-executable program code for indicating the search result, wherein the code is configured to enable the execution of:

configuring a plurality of disks in the RAID system as a raw mirror for storing configuration data of the RAID system;

storing metadata for the raw mirror in the plurality of disks, the metadata stored in each of the plurality of disks including:

an identifier identifying that the disk belongs to the raw mirror, and a sequence number identifying a writing operation for a block storing the metadata in the disk;

controlling reading and writing of the raw mirror based on the metadata;

in response to booting of the RAID system, obtaining the sequence numbers of corresponding blocks of the plurality of disks;

comparing the sequence numbers of the corresponding blocks of the plurality of disks; and storing a maximum sequence number in a cache as the latest sequence numbers for the corresponding blocks.

27. The computer program product of claim 26, wherein controlling reading and writing of the raw mirror based on the metadata comprises:

obtaining from the cache the latest sequence numbers for the corresponding blocks of the plurality of disks;

increasing the latest sequence numbers;

storing the increased latest sequence numbers into the plurality of disks; and writing the configuration data into the corresponding blocks of the plurality of disks.

* * * * *